United States Patent
Byrne

(10) Patent No.: US 7,209,184 B2
(45) Date of Patent: Apr. 24, 2007

(54) VIDEO APPARATUS WITH VIDEO SIGNAL DETECTION AND RESPECTIVE METHOD FOR RECOGNIZING A VIDEO SIGNAL

(75) Inventor: Graham Byrne, Leeds (GB)

(73) Assignee: Thomson Licensing, Inc., Boulogne Cedex (FR)

( * ) Notice: Subject to any disclaimer, the term of this patent is extended or adjusted under 35 U.S.C. 154(b) by 426 days.

(21) Appl. No.: 10/786,626

(22) Filed: Feb. 25, 2004

(65) Prior Publication Data

US 2004/0170380 A1     Sep. 2, 2004

(30) Foreign Application Priority Data

Feb. 28, 2003   (EP) .................................. 03004542

(51) Int. Cl.
*H04N 5/268*   (2006.01)
(52) U.S. Cl. ..................... 348/705; 348/706
(58) Field of Classification Search ............... 348/705, 348/706, 722, 500, 521, 659; 370/357; 386/46, 386/125; *H04N 5/268, 9/67*
See application file for complete search history.

(56) References Cited

U.S. PATENT DOCUMENTS 5,631,712 A * 5/1997 Suh et al. .................. 348/705

5,943,508 A * 8/1999 Penney et al. .............. 348/705

FOREIGN PATENT DOCUMENTS

| JP | 06 04 6453 | 2/1994 |
| WO | 00 22 817 | 4/2000 |
| WO | 01 84 845 | 11/2001 |

OTHER PUBLICATIONS

Search Report.

* cited by examiner

*Primary Examiner*—Sherrie Hsia
(74) *Attorney, Agent, or Firm*—Joseph J. Laks; Robert D. Shedd; William A. Lagoni

(57) ABSTRACT

A video apparatus comprises an input switching matrix, to which a video input is coupled, the video input comprising a terminal for a component video signal and a CVBS terminal and/or a S-VHS terminal, a synchronization signal detector and a color decoder coupled to the input switching matrix, an output switching matrix coupled to the input switching matrix and to the color decoder, and a microcontroller coupled to the input switching matrix and to the synchronization signal detector for controlling the input switching matrix. The detection of the component video signal is made automatic by means of the microcontroller, the synchronization signal detector and the color decoder.

3 Claims, 1 Drawing Sheet

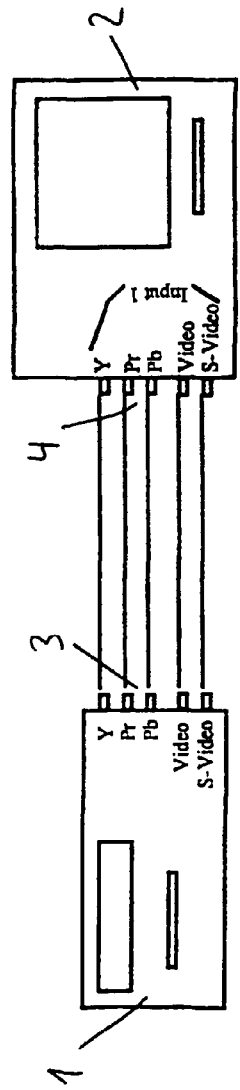
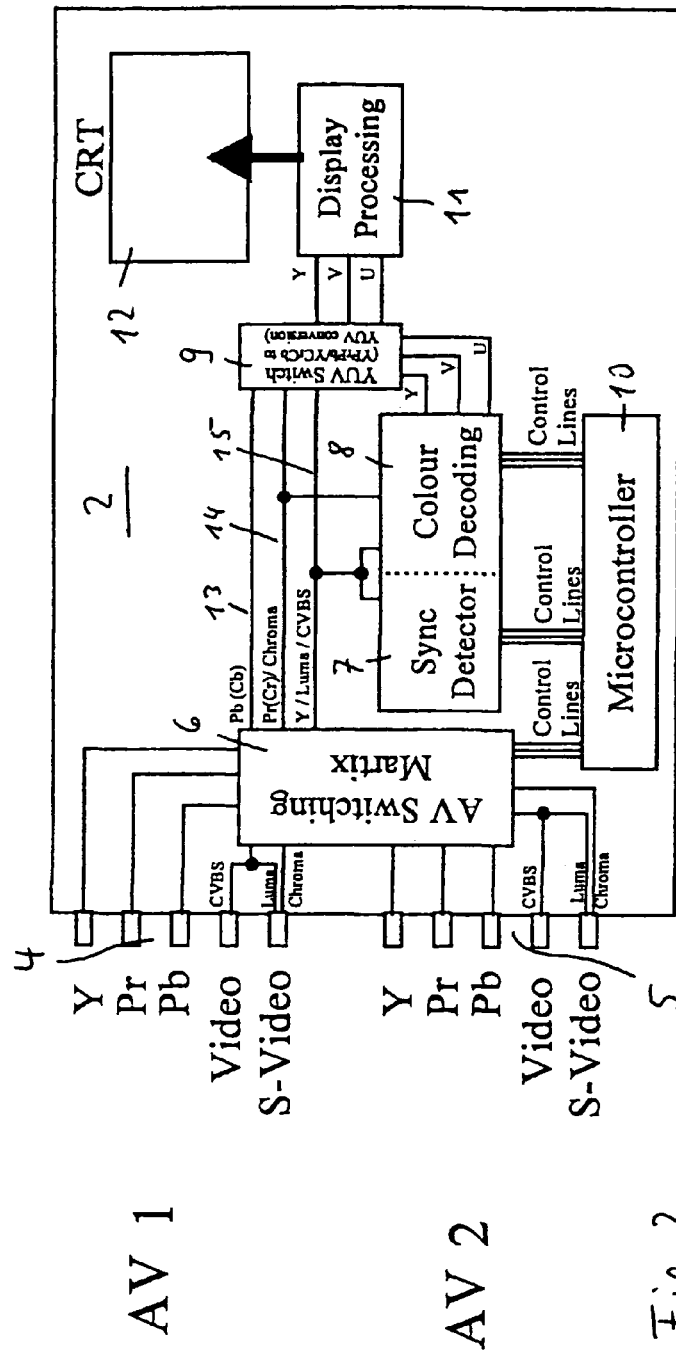
Fig. 1
Fig. 2

VIDEO APPARATUS WITH VIDEO SIGNAL DETECTION AND RESPECTIVE METHOD FOR RECOGNIZING A VIDEO SIGNAL

FIELD OF THE INVENTION

This application claims the benefit under 35 U.S.C. § 365 of European patent application No. 03004542.1 filed Feb. 28, 2003.

The invention relates to a video apparatus comprising a video input, an input switching matrix coupled to the video input, a synchronization signal detector coupled to a luminance output of the input switching matrix and a color decoder being coupled to a color output and also to the luminance output of the input switching matrix. An apparatus of this kind is known for example from a television set or a video recorder, which comprise several audio/video (AV) inputs, to which other video appliances, for example a DVD player or a video recorder, can be coupled.

BACKGROUND

For the transmission of video signals between consumer electronics video appliances, several interface standards are known. The best video quality can be provided by so-called R, G, B signals, in which the three colors red, green and blue are provided each as separate signals, corresponding to the colors as displayed in a color picture tube. But because this video standard needs three separate signal lines with a high bandwidth for each signal, this standard is rarely used for consumer electronics appliances.

Very common is the CVBS transmission (FBAS in Germany), according to which standard the video signal is comprised of a color signal C and a luminance signal Y, including also a synchronization signal S and a blanking signal B. This video standard is widely used, for example also for terrestrial television transmission. Because luminance and chrominance signals are added together for a transmission via one line, these components have to be separated in a television set for the reproduction on the display.

The CVBS standard has been used since the beginning of color television sets and is a good compromise between picture quality and transmission bandwidth. Because luminance and chrominance signals are closely superposed in this standard, a perfect separation of the luminance and the chrominance signal in a television receiver is not possible and leads for example to cross color and cross luminance distortions. For high quality video recording and video storing therefore often other video standards are used, for example component video signals and S-Video (S-VHS).

The component video standard provides three separate signals, YPrPb, or YCrCb, which provide two color-difference signals Pr and Pb, and the Y signal provides the luminance information, from these three signals all RGB color signals can be generated. The YPrPb signals are similar to the Y, U, V signals as used in a television set, but have different voltage levels. In the S-Video standard, which is used for example as an interface for S-VHS recorders, the color components U and V are combined via quadrature amplitude modulation (QAM) to a chrominance signal C.

Because of a large variety of consumer video appliances, for example VHS and S-VHS recorders, camcorders, DVD-players and DVD-recorders, actual television sets are equipped with several inputs, known for example as AV1, AV2 and AV3, to which each a video appliance can be connected. The video inputs are coupled to an input switching matrix, via which a user of the television set can select a specific input. Because of the various kinds of video standards, the video inputs, or at least the main video input AV1, should be able to handle the video signals of all respective standards. Therefore, a user must know, which video standard is available at the output of the video appliance being coupled to the television set or an automatical recognition of video signal has to be provided by the television set.

SUMMARY OF THE INVENTION

The video apparatus according to the invention comprises an input switching matrix, to which at least one video input is coupled, the input comprising a terminal for a component video signal and at least a CVBS terminal, likewise also a S-VHS terminal. The video apparatus comprises further a synchronization signal detector being coupled to a luminance output of the input switching matrix, a color decoder being coupled to the luminance output and to a chrominance output of the input switching matrix, an output switching matrix being coupled to the input switching matrix and to the color decoder, and a microcontroller for controlling the input switching matrix, the microcontroller being coupled also to the synchronization signal detector.

The detection of the component video signal is made automatic by means of the microcontroller, which, after selecting a video input, sets the input switching matrix to pass the Y signal from the terminal for the component video signal of this video input to the synchronization signal detector. Then the microcontroller waits for a specified period of time, and subsequently accesses the synchronization signal detector to get a feedback on the validity and stability of the signal being coupled to the synchronization signal detector. If the signal is a valid luminance signal, then a component video signal is available at this video input, and the component video signal is then provided to the output switching matrix. If the signal is not a valid luminance signal, then the microcontroller sets the input switching matrix to pass either a CVBS signal or a S-VHS signal to the synchronization signal detector and the color decoder. Then the CVBS luminance signal, or respectively a S-VHS luminance signal, is tested for a valid synchronization signal and chrominance signal.

The invention provides a user therefore with an automatic setup to view a video signal from a video appliance, which comprises a video output according to one of the known video standards, and which may comprise in particular a component video signal output. A user therefore does not need to understand the video signal standards available at the output of the video appliance and does not have to select a specific input video type. This could be done for example with an on-screen-display (OSD) of a television set connected to the video appliance, the on-screen-display providing a list of the possible input video types. The invention therefore saves software memory for the instruction sets, which would have been necessary in the on-screen-display of the video display appliance for the selection of the video input types. It avoids also respective information in the user manual and translations of the user manual for the countries, in which the video apparatus is sold.

It is therefore possible to detect component video signals with the synchronization signal detector by means of the microcontroller. The invention is useful in particular for television sets, analog or digital video recorders, audio/video (A/V) receivers, and any other appliances comprising a video input for several television standards and a synchronization signal detector.

BRIEF DESCRIPTION OF THE DRAWINGS

The invention will be explained now in more detail with regard to schematic drawings, which show:
FIG. 1 a DVD player coupled to a television set,
FIG. 2 the input section of the television set according to FIG. 1.

DETAILED DESCRIPTION OF PREFERRED EMBODIMENTS

In FIG. 1 a DVD player 1 is shown comprising video output terminals 3 according to the known video standards Video, for example CVBS, S-Video providing S-VHS video signals, and a component video signal output YPrPb for providing a component video signal. A specific video output may be selected by a user, or the video signal may be applied to all video outputs of the DVD player, when playing a DVD. As explained before, for highest picture quality the component video signal output is preferred.

The DVD player 1 is connected to a video apparatus, in this embodiment to a television set 2, which comprises a video input 4 to which the outputs of the DVD player 1 are coupled. The television set usually comprises further video inputs, not shown in FIG. 1, to which other video sources, for example a video recorder or a settop box, can be connected.

In FIG. 2 the television set 2 is shown in more detail, especially the input section of the television set 2. As explained before, the video input 4 comprises terminals YPrPb, Video and S-Video for television signals according to the respective standards CVBS, S-VHS and component video. The television set 2 comprises further a second video input 5 having the same input terminals as the video input 4. The video inputs 4 and 5, often called AV1 and AV2, comprise further respective terminals for the audio signals, which are not shown here because the audio signals are not relevant for the invention.

The video inputs 4 and 5 are coupled to an input switching matrix 6, via which a user of the television set can select a respective input, as wanted. The input switching matrix 6 provides three output lines 13, 14 and 15, at which the respective video signals are present, in accordance to the selection of the input switching matrix 6, and as applied at a respective video input 4 or 5.

In case a component video signal is applied to the video input 4 and selected by the input switching matrix 6, at the output lines 13, 14, 15 the video signals Pb, Pr and Y are present. In case of a S-VHS signal, a chrominance signal Chroma is present at line 14 and a luminance signal Luma at line 15, and in case of a CVBS signal, the CVBS signal is present at line 15. The line 15 is coupled to a synchronization detector 7, to extract the synchronization pulses from the luminance signal, and to a color decoder 8, for controlling the color decoding of a chrominance signal present at line 14. The line 15 is also coupled to the color decoder 8. Further, the lines 13, 14, 15 are coupled to an output switching matrix 9, which, in case a component video signal YPbPr is present, converts the Pb, Pr signals into U and V color signals, for providing YUV signals at its output, ready for a processing in a display processing unit 11. The display processing of the video signals within the television set 2 is not further explained here, because it is well known in prior art. It provides respective output signals for a display 12, for example a cathode ray tube (CRT), a LCD or a plasma panel. Also not shown here is a tuner section of the television set 2, which is necessary for viewing terrestrial or cable television programs and which is usually also coupled to the input switching matrix 6.

In case a CVBS signal is present at the output line 15, the synchronization signal detector 7 and the color decoder 8 provide respective output signals YUV at the output of the color decoder 8. This is also the case when an S-VHS signal is present at lines 14 and 15. The output of the color decoder 8 is also coupled to the output switching matrix 9. The input switching matrix 6, the synchronization signal detector 7 and the color decoder 8 are each coupled to and controlled by a microcontroller 10, for example via an I2C bus.

According to the invention, the recognition of the respective signals YPrPb, Chroma/Luma in case of an S-VHS signal and CVBS at output lines 13, 14, 15 is made automatic by means of the synchronization signal detector 7, the color decoder and the microcontroller 10. When a user switches the input switching matrix 6 for example to the video input 4, for viewing a video provided by a DVD player being coupled to the video input 4, then at the output lines 13, 14 and 15 a video signal is present. The input switching matrix 6 is set in response to the microcontroller 10, as instructed by the user. The Y signal present at line 15 is then passed to the synchronization signal detector 7.

Then the microcontroller waits for a specified period of time, for example a few milliseconds, to allow for a signal to stabilize. Then the microcontroller 10 accesses the synchronization signal detector 7 to get a feedback on the validity or stability of a luminance signal. If the luminance signal is valid, then a component video input is present at video input 4, and which is then switched through by the output video matrix 9 for displaying. If no valid luminance signal is present at the synchronization detector 7, then the microcontroller 10 switches the input switching matrix to the S-VHS terminals S-Video of the video input 4. Then the S-VHS input terminal is tested for a valid synchronization signal. In case no S-VHS signal is present, then the input switching matrix 6 switches to the video terminal of the video input 4, for checking for a valid CVBS signal.

Component video signals and S-VHS can be distinguished in particular by means of the color decoder 8. For example, the color decoder 8 can check for a color burst signal on line 14, which is present within the chrominance signal of the S-VHS signal, and which is not present in the respective component signal Pr, or Pb. A respective feedback from the color decoder 8 is made to the microcontroller 10 via the control lines. Also a CVBS/S-Video detection already exists in television set, it is according to the present invention also possible to detect and distinguish the component video signals by the microcontroller 10, when using the synchronization signal detector 7, and the color decoder 8.

The present invention is not limited to the embodiment as shown and described with regard to the figures, and various available modifications come possible for a person skilled in the art without departing from the scope of the invention. For example, the invention may be utilized also within digital surround amplifiers, digital video recorders and other equipment comprising input switching, a synchronization signal detector and a microprocessor.

The invention claimed is:
1. Video apparatus comprising
an input switching matrix, to which at least one video input is coupled, the video input comprising a terminal for a component video signal and a CVBS terminal (Video) or a S-VHS terminal, a synchronization signal detector coupled to a luminance output of the input switching matrix, a color decoder coupled to the luminance output and to a chrominance output of the input switching matrix, an output switching matrix coupled to the input switching matrix and to the color decoder, and a microcontroller coupled to the input switching matrix and to the synchronization signal detector for controlling the input switching matrix, wherein the detection of the component video signal is made automatic by means of the microcontroller, which, after selecting a Y video input, sets the input switching matrix to pass a signal from the terminal for the component video signal of said video input to the synchronization signal detector, and, in case this terminal provides a valid luminance signal, then a component video signal is recognized, which is switched through then by the output switching matrix, and, in case no valid luminance signal is available at the component video terminal, then the microcontroller switches the input switching matrix to the CVBS terminal or a S-VHS terminal of said video input, respectively, for checking for a valid synchronization signal by means of the synchronization signal detector.

2. Video apparatus according to claim 1, further comprising at least a first and a second video input, that at least the first video input comprises terminals for a component video signal, for a CVBS video signal and for a S-VHS video signal, and that after selecting the first video input, the microcontroller checks first for a component video signal, then for a S-VHS video signal, and then for a CVBS video signal.

3. Method for automatic detection of a video signal comprising the steps of:
   a) selecting a component video signal:
   b) switching said component video signal to an output if a valid luminance signal exists at a component video input:
   c) selecting a CVBS input signal or an S-VHS input signal if a valid luminance signal does not exist at said component video input: and
   d) switching said CVBS signal or said S-VHS signal to an output if a valid luminance signal exists at respective a CVBS input or a S-VHS input.

* * * * *